(12) United States Patent
Lin

(10) Patent No.: US 10,416,375 B1
(45) Date of Patent: Sep. 17, 2019

(54) BACKLIGHT MODULE AND DISPLAY DEVICE

(71) Applicant: XIAMEN TIANMA MICRO-ELECTRONICS CO., LTD., Xiamen (CN)

(72) Inventor: Wei Lin, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/283,189

(22) Filed: Feb. 22, 2019

(30) Foreign Application Priority Data

Dec. 25, 2018 (CN) .......................... 2018 1 1589157

(51) Int. Cl.
  *F21V 8/00* (2006.01)
  *G02F 1/1333* (2006.01)
  *G02F 1/13357* (2006.01)

(52) U.S. Cl.
  CPC ......... *G02B 6/0088* (2013.01); *G02B 6/0055* (2013.01); *G02B 6/0073* (2013.01); *G02F 1/1336* (2013.01); *G02F 1/133308* (2013.01); *G02F 2202/28* (2013.01)

(58) Field of Classification Search
  CPC .. G02B 6/0088; G02B 6/0055; G02B 6/0073; G02F 1/133308; G02F 1/1336
  USPC ....................................................... 362/97.2
  See application file for complete search history.

(56) References Cited

U.S. PATENT DOCUMENTS

| 5,523,873 | A  | * | 6/1996  | Bradford, III | .... G02F 1/133382 349/139 |
| 2006/0083028 | A1 | * | 4/2006  | Sun | ...................... G02B 6/0016 362/615 |
| 2007/0147091 | A1 | * | 6/2007  | Ma | ...................... G02B 6/0088 362/633 |
| 2007/0274079 | A1 | * | 11/2007 | Poh | ...................... G02B 6/0031 362/341 |
| 2007/0274670 | A1 | * | 11/2007 | Tsai | ..................... G02B 6/0088 385/147 |
| 2007/0279728 | A1 | * | 12/2007 | Murakata | ............. G02B 6/0088 359/245 |
| 2008/0100771 | A1 | * | 5/2008  | Ableitner | ............. G02B 6/0021 349/61 |

(Continued)

FOREIGN PATENT DOCUMENTS

CN          206848638 U      1/2018

*Primary Examiner* — Bryon T Gyllstrom
(74) *Attorney, Agent, or Firm* — Anova Law Group, PLLC

(57) ABSTRACT

Backlight module and display device are provided. The backlight module includes: a metal frame including a bottom plate and a sidewall, a light guide plate, a light source, an adhesive frame, and a notch. An accommodating cavity is formed between the bottom plate and a sidewall, the sidewall including first, second, third, and fourth sidewalls. The first sidewall includes at least one irregularly-shaped portion, protruding toward an inside of the accommodating cavity to form the notch. The light guide plate, the light source and the adhesive frame are all disposed in the accommodating cavity. The adhesive frame is between the light guide plate and the sidewall. The light source is between the light guide plate and the third sidewall. The adhesive frame includes at least one first gap on a side of the notch away from the light source. A first light guide portion is disposed in the first gap.

18 Claims, 16 Drawing Sheets

(56) References Cited

U.S. PATENT DOCUMENTS

| | | | | |
|---|---|---|---|---|
| 2008/0123015 A1* | 5/2008 | Tanaka | ............... | G02B 6/0083 349/58 |
| 2008/0137369 A1* | 6/2008 | Suzuki | ............... | G02B 6/0021 362/612 |
| 2013/0002987 A1* | 1/2013 | Sugiura | ............... | G02B 6/0088 349/65 |
| 2015/0173225 A1* | 6/2015 | Peng | ............... | G06F 1/16 361/728 |
| 2016/0018590 A1* | 1/2016 | Uchida | ............... | G02B 6/002 362/611 |
| 2016/0085020 A1* | 3/2016 | Kuromizu | ............... | G02B 6/0088 362/606 |

* cited by examiner

BACKLIGHT MODULE AND DISPLAY DEVICE

CROSS-REFERENCES TO RELATED APPLICATION

This application claims the priority of Chinese Patent Application No. 201811589157.7, filed on Dec. 25, 2018, the content of which is incorporated herein by reference in its entirety.

TECHNICAL FIELD

The present disclosure generally relates to the field of display technology and more particularly, relates to a backlight module and a display device.

BACKGROUND

Since liquid crystals themselves do not emit light, external backlight modules are required to provide light sources in various liquid crystal displays (LCDs), which may enable LCDs to display images. Therefore, the light emitting effects of the backlight modules will directly affect the visual effects of LCDs.

With continuous requirements for visual effects in recent years, narrow-framed LCDs have gradually become popular. Since the frame is narrowed, the screen-to-body ratio of the LCD is increased, and the degree of visual restraint is greatly reduced when being viewed. In order to narrow the frame of the LCD, current methods include designing the LCD into an irregularly-shaped display other than a regularly shaped rectangle. The irregularly-shaped display may better avoid functional components such as cameras, speakers, etc. and may have a high screen-to-body ratio. However, the light emitted by the light-emitting device in the backlight module may often form a bright region due to excessive aggregation in the irregularly-shaped area or may form a dark region due to the inability of the light to enter the liquid crystal layer, resulting in uneven luminance of the entire screen when images are displayed by the LCD, which may be difficult to meet requirements of people's visual effects.

SUMMARY

One aspect of the present disclosure provides a backlight module. The backlight module includes: a metal frame, a light guide plate, a light source, an adhesive frame, and a notch. The metal frame includes a bottom plate and a sidewall. The sidewall includes a first sidewall, a second sidewall, a third sidewall, and a fourth sidewall. The first sidewall and the second sidewall are on opposite sides of the bottom plate along a first direction. The third sidewall and the fourth sidewall are on opposite sides of the bottom plate along a second direction. An accommodating cavity is formed between the bottom plate, the first sidewall, the second sidewall, the third sidewall, and the fourth sidewall. The first direction intersects the second direction. The first sidewall includes at least one irregularly-shaped portion, and the irregularly-shaped portion protrudes toward an inside of the accommodating cavity to form the notch. The light guide plate, the light source and the adhesive frame are all disposed in the accommodating cavity. The adhesive frame is between the light guide plate and the sidewall. The light source and the light guide plate are arranged along the second direction. The light source is between the light guide plate and the third sidewall. The adhesive frame includes at least one first gap; the first gap is on a side of the notch away from the light source in the second direction, and a first light guide portion is disposed in the first gap.

Another aspect of the present disclosure provides a display device. The display device includes the backlight module provided by the present disclosure.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure. Drawings incorporated in the specification and forming part of the specification demonstrate embodiments of the present disclosure and, together with the specification, describe the principles of the present disclosure.

DETAILED DESCRIPTION

Figure 1:
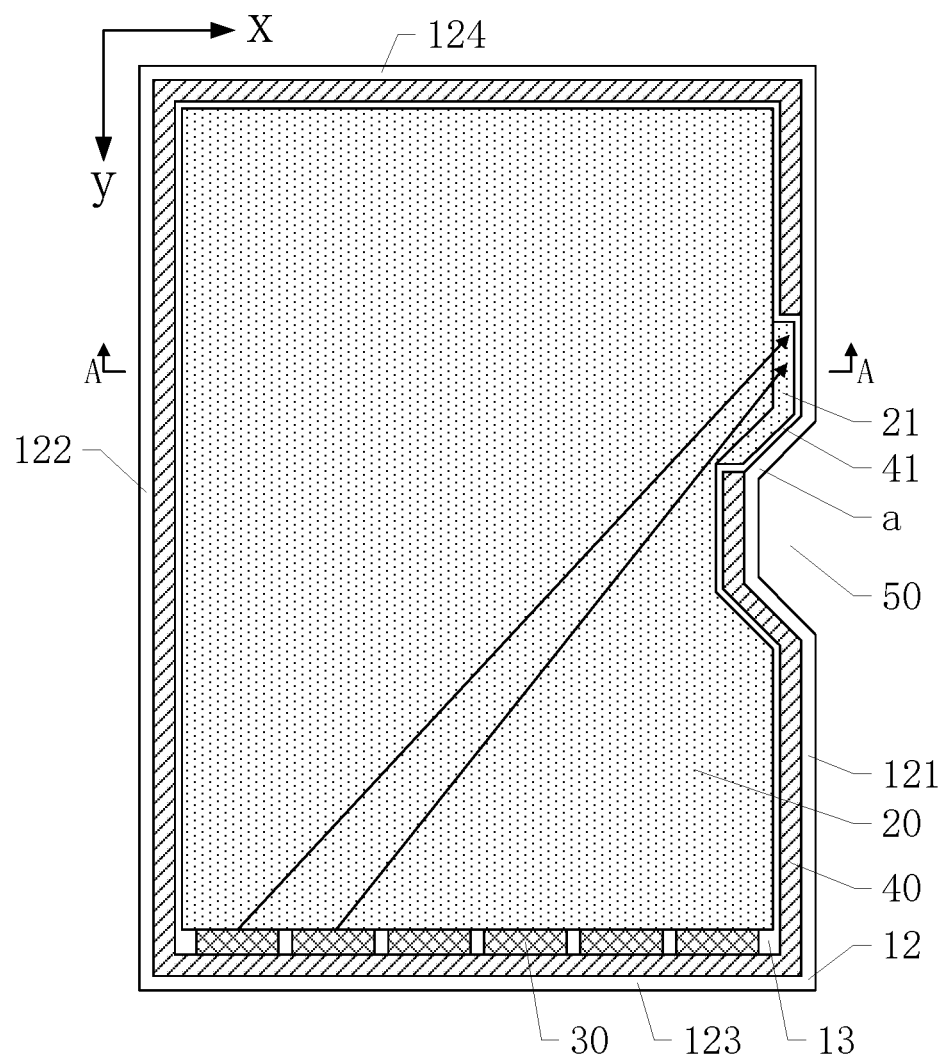
FIG. 1 illustrates a top-view structural schematic of an exemplary backlight module according to embodiments of the present disclosure.

Reference will now be made in detail to exemplary embodiments of the disclosure, which are illustrated in the accompanying drawings. Wherever possible, the same reference numbers will be used throughout the drawings to refer to the same or like parts.

Various exemplary embodiments of the present disclosure will be described in detail with reference to the drawings. It should be noted that the relative arrangements of components and steps, numerical expressions and numerical values set forth in the embodiments are not intended to limit the scope of the present disclosure unless otherwise specified.

The following description of at least one exemplary embodiment is merely illustrative, and not as any limitations on the present disclosure and its application or use.

Techniques, methods and instruments known to those skilled in the art may not be discussed in detail, but where appropriate, the techniques, methods and instruments should be considered as part of the specification.

In all of the examples illustrated and discussed herein, any specific values should be construed as merely illustrative, and not as a limitation. Thus, other examples of the exemplary embodiments may have different values.

It should be noted that similar reference numerals and letters refer to similar items in the following figures, and therefore, once an item is defined in a figure, it is not required to be further discussed in the subsequent figures.

The present disclosure provides a backlight module and a display device, to improve the bright and dark regions and enable the backlight with more uniform luminance.

Figure 2:
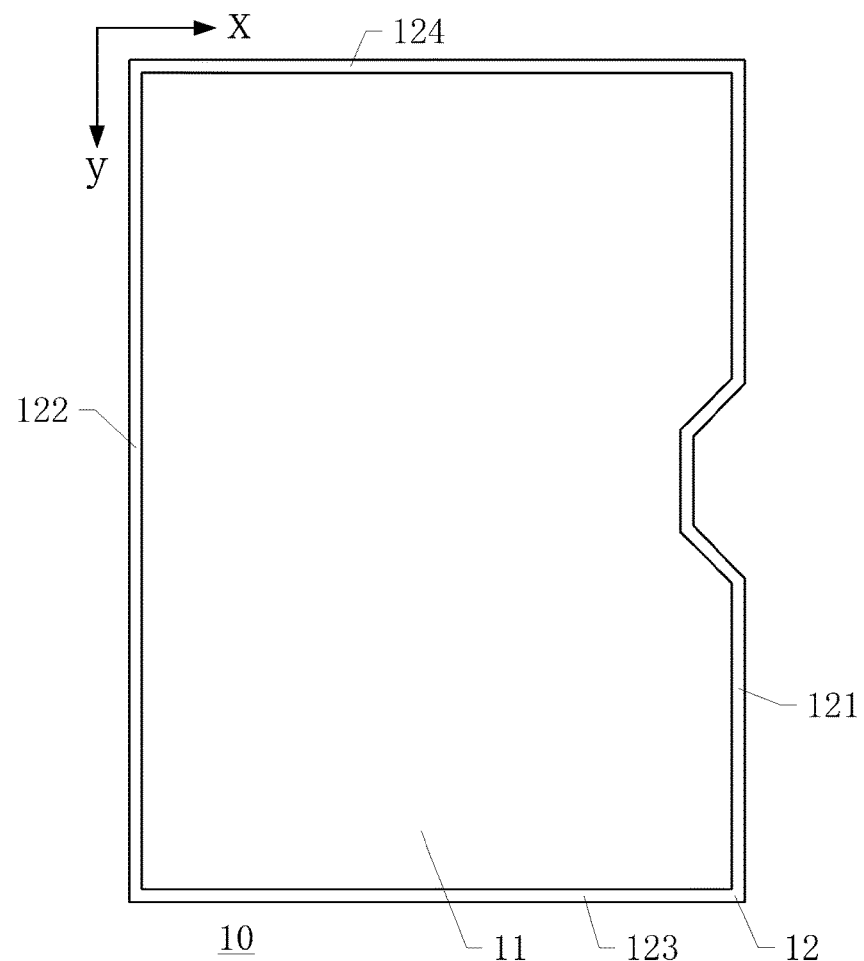
FIG. 2 illustrates a structural schematic of an exemplary metal frame in FIG. 1.
Figure 3:
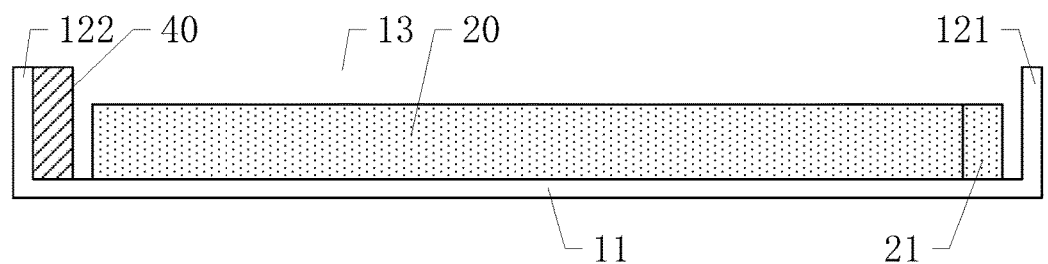
FIG. 3 illustrates a cross-sectional structural schematic along A-A direction in FIG. 1.

Referring to FIG. 1-FIG. 3, the present disclosure provides a backlight module including: a metal frame 10, a light guide plate 20, a light source 30, an adhesive frame 40, and a notch 50. The metal frame 10 may include a bottom plate 11 and a sidewall 12. The sidewall 12 may include a first sidewall 121, a second sidewall 122, a third sidewall 123, and a fourth sidewall 124. The first sidewall 121 and the second sidewall 122 may be on opposite sides of the bottom plate 11 along a first direction x, and the third sidewall 123 and the fourth sidewall 124 may be on opposite sides of the bottom plate 11 along a second direction y. An accommodating cavity 13 may be formed between the bottom plate 11, the first sidewall 121, the second sidewall 122, the third sidewall 123, and the fourth sidewall 124. The first direction x may intersect the second direction y.

The first sidewall 121 may include at least one irregularly-shaped portion a. The irregularly-shaped portion a may protrude toward an inside of the accommodating cavity 13 to form the notch 50. The light guide plate 20, the light source 30 and the adhesive frame 40 may all be disposed in the accommodating cavity 13. The adhesive frame 40 may be between the light guide plate 20 and the sidewall 12. The light source 30 and the light guide plate 20 may be arranged along the second direction y, and the light source 30 may be between the light guide plate 20 and the third sidewall 123. The adhesive frame 40 may include at least one first gap 41. The first gap 41 may be on the side of the notch 50 away from the light source 30 in the second direction y, and a first light guide portion 21 may be disposed in the first gap 41.

In one embodiment, the sidewall 12 of the metal frame 10 may include the first sidewall 121, the second sidewall 122, the third sidewall 123, and the fourth sidewall 124. The first sidewall 121 and the second sidewall 122 may be disposed on two sides of the bottom plate 11 in the first direction x, and the third sidewall 123 and the fourth sidewall 124 may be disposed on two sides of the bottom plate 11 in the second direction y. Therefore, a substantially semi-closed space, that is, the accommodating cavity 13 for containing components including the light guide plate 20, the light source 30, the adhesive frame 40, etc., may be formed between the first sidewall 121, the second sidewall 122, the third sidewall 123, the fourth sidewall 124, and the bottom plate 11. The metal frame 10 may be made of a material including at least one of iron, aluminum, galvanized aluminum, aluminum alloy or any other suitable materials, so the metal frame 10 may have better supporting strength for components disposed in the accommodating cavity 13. Of course, in order to reduce the manufacturing cost in actual production processes, the metal frame 10 may be made of plastics instead of the metals. However, the material of the metal frame 10 may not be specifically limited, and any suitable material(s) may be used for the metal frame according to various embodiments of the present disclosure.

At least one irregularly-shaped portion a may be disposed on the first sidewall 121. The irregularly-shaped portion may protrude toward the inside of the accommodating cavity 13, so the notch 50 may be formed on the side of the irregularly-shaped portion a away from the accommodating cavity 13 in the first direction. The number, size and specific position on the first sidewall 121 of the irregularly-shaped portion a may be set according to actual needs on the basis of satisfying the above-mentioned structural relationship. That is, the number, size and specific position of the notch 50 may be set according to actual needs, and the shape of the notch 50 may depend on the specific form of the irregularly-shaped portion a protruding toward the inside of the accommodating cavity 13, which may not be specifically limited according to various embodiments of the present disclosure. In FIG. 1 and FIG. 2, only a U-shaped notch 50 is illustrated as an example. It can be understood that the number of the notch 50 may be two or more, and the shape of the notch 50 may also be semi-circular, semi-elliptical, etc., which may not be described in detail subsequently. Some functional devices may be mounted in the notch 50, so the display device may be effectively improved in functions and visual effects.

The light source 30 may be, but is not limited to, a light-emitting diode (LED) light source. FIG. 1 illustrates a certain number and size of light sources 30 configured between the light guide plate 20 and the third sidewall 123 only for illustrative purposes, and any size and number of the light sources 30 may be encompassed within the scope of the present disclosure. Since the light guide plate 20 is printed with various light guide points with different spacings and sizes, the light emitted from the light source 30 may form a light-exiting surface on the side of the light guide plate 20 away from the bottom plate 11 through the light guide points. That is, the light guide plate 20 may convert the light emitted from the point light source LED into a surface light source which may be provided to a display device for displaying pictures.

The adhesive frame 40 may be between the light guide plate 20 and the sidewall 12 to limit the light guide plate 20 to the accommodating cavity 13. Meanwhile, the adhesive frame 40 may have a certain reflective function to re-reflect the light emitted by the light guide plate 20 into the light guide plate 20, which may improve the emission rate of light on the exiting surface. The material of the adhesive frame 40 may be, but is not limited to, polycarbonate. In order to improve the reflective function, the color of the adhesive frame 40 may be set to white, or a reflective tape may be disposed on the side of the adhesive frame 40 adjacent to the light guide plate 20, which may not be specifically limited according to various embodiments of the present disclosure.

At least one first gap 41 may be disposed on the adhesive frame 40, and the portion of the adhesive frame 40 other than the first gap 41 may still have better supporting strength to the mounted display panel (not shown). The first gap 41 may be on the side of the notch 50 away from the light source 30 in the second direction y. The two sides of the first gap 41 may be the light guide plate 20 and the first sidewall 121 respectively in the first direction x. The shape and number of the first gap 41 may be set according to actual situations, which may not be specifically limited according to various embodiments of the present disclosure. Only one first gap 41 may be disposed as an example for description.

For example, the light emitted from the light source 30 may be transmitted through the light guide plate 20 and may be blocked at the adhesive frame 40. Therefore, when the first gap 41 is not disposed, sufficient light may be difficult to enter the region where the first gap 41 should be located, thereby forming a dark region. In one embodiment, partial light emitted from the light source 30 may enter the first gap 41 due to the presence of the first gap 41. Meanwhile, since the first light guide portion 21 is disposed in the first gap 41, partial emitted light may be transmitted and reflected through the first light guide portion 21, and the exiting surface may be formed on the side of the first light guide portion 21 away from the bottom plate 11. That is, the first light guide portion 21 may be enabled to emit light which may be provided as the backlight source to the display device for displaying pictures. Therefore, the first light guide portion 21 together with the light guide plate 20 may transmit and reflect the light emitted from the light source 30, thereby facilitating the expansion of the light-exiting surface of the backlight module, effectively improving the dark region effect at the first gap 41, and making more uniform luminance of the light-emitting region of the backlight module, which may improve the display effect of the display device.

However, since the size of the first gap 41 is smaller than the size of the light guide plate 20, the ability of the first light guide portion 21 to transmit and reflect light may be relatively limited. In order to further improve the ability of the first light guide portion 21 to transmit and reflect light, the first light guide portion 21 may be made of a material having a high light-transmitting efficiency, and the plurality of light guide points may be disposed inside the first light guide portion 21, which may not be specifically limited according to various embodiments of the present disclosure.

It should be noted that, in order to more clearly illustrate the technical solutions of the present disclosure, in one embodiment, FIG. 1 and FIG. 3 illustrate a portion of exemplary backlight module. Meanwhile, since the first light guide portion 21 and the light guide plate 20 have similar light transmitting effects, both may be filled with the same pattern as exemplarily shown in FIG. 1 and FIG. 3. It can be understood that the first light guide portion 21 may be attached tightly to the light guide plate 20, or a certain gap may also be formed between the first light guide portion 21 and the light guide plate 20, which may not be specifically limited according to various embodiments of the present disclosure.

The backlight module provided in the present disclosure may at least have the following technical effects.

The metal frame may be used to accommodate components such as light guide plates, light sources, etc. The irregularly-shaped portion may be disposed on the first sidewall of the metal frame, thereby forming a notch through the irregularly-shaped portion. Devices, such as cameras, etc., may be mounted in the region of the notch, which may satisfy various functions and visual requirements. The first light guide portion may be disposed in the first gap of the adhesive frame. On the one hand, the first light guide portion together with the light guide plate may transmit light, which may be advantageous to expand the light-exiting surface of the backlight module. On the other hand, although the first gap is on the side of the notch away from the light source, the amount of exiting light from the first gap may be increased through the first light guide portion, thereby effectively preventing the dark region from being formed at the first gap, improving the luminance uniformity of the light-emitting region of the backlight module, and improving the luminance unevenness of the display device and the display effect of the display device.

Figure 4:
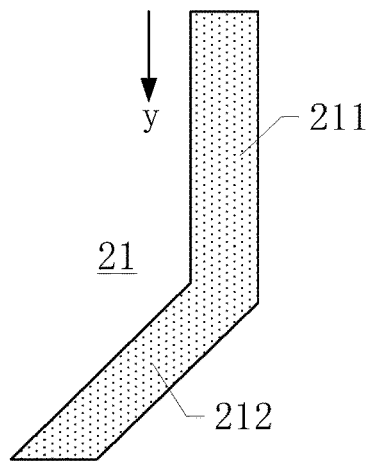
FIG. 4 illustrates an enlarged structural schematic of an exemplary first light guide portion in FIG. 1.

Optionally, referring to FIG. 1 and FIG. 4, the first light guide portion 21 may include a first sub-portion 211 and a second sub-portion 212. The second sub-portion 212 may be on a side of the notch 50 away from the light source 30. The first sub-portion 211 may extend along the second direction y and may on a side of the second sub-portion 212 away from the notch 50.

For example, the first light guide portion 21 may include two portions which are the first sub-portion 211 and the second sub-portion 212. The second sub-portion 212 may be on the side of the notch 50 away from the light source 30. When the second sub-portion 212 is not disposed, the light in the region where the second sub-portion 212 is located may be much darker than the light in the region where the first sub-portion 211 is located, that is, the light emitted from the light source 30 may be more difficult to reach the region where the second sub-portion 212 is located. However, in one embodiment, the first sub-portion 211 may extend along the second direction y and may be on the side of the second sub-portion 212 away from the notch 50. The light emitted from the light source 30 may be relatively easy to enter the first sub-portion 211, and this partial light may be better transmitted and reflected to the second sub-portion 212 by disposing the light guide points, which may enable the second sub-portion 212 to emit light, so the luminance of the display device on the side of the notch 50 away from the light source 30 may be effectively improved and the display effect may be also improved. The shape of the second sub-portion 212 may match the shape of the notch 50, as shown in FIG. 1. Of course, on the basis of satisfying the above-mentioned structural relationship, the shape of the second sub-portion 212 may also be different from the shape of the notch 50, which may not be specifically limited according to various embodiments of the present disclosure.

Figure 5:
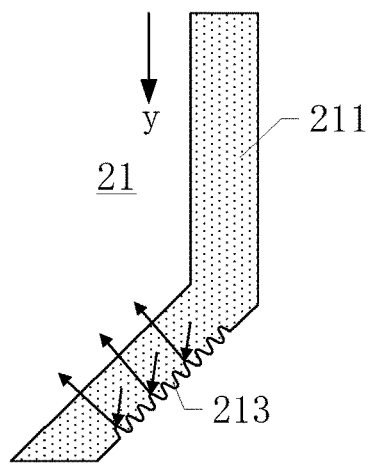
FIG. 5 illustrates an enlarged structural schematic of an exemplary first light guide portion in FIG. 1.

Optionally, referring to FIG. 1 and FIG. 5, a plurality of first protrusions 213 may be disposed on the side surface of the second sub-portion 212 adjacent to the notch 50 in the second direction y.

In one embodiment, the plurality of the first protrusions 213 may be disposed on the side surface of the second sub-portion 212 adjacent to the notch 50 in the second direction y. Therefore, after entering the second sub-portion 212, the light, which is emitted from the light source 30 and reflected from the first sub-portion 211 and/or the light guide points of the light guide plate 20, may be reflected by the plurality of the first protrusions 213, thereby improving the luminance of the display device on the side of the notch 50 away from the light source 30.

It should be noted that, after the light enters the second sub-portion 212, only the paths of partial light reflected by the wave-shaped first protrusions 213 may be illustrated in FIG. 5. Moreover, by appropriately setting the number and shape of the first protrusions 213, the reflection paths of the light in the second sub-portion 212 may be further increased, so the luminance of the display device on the side of the notch 50 away from the light source 30 may be further improved. It can be understood that the plurality of the first protrusions 213 may also be arranged in other shapes, but the number and arrangement shape of the first protrusions 213 may not be specifically limited according to various embodiments of the present disclosure.

Figure 6:
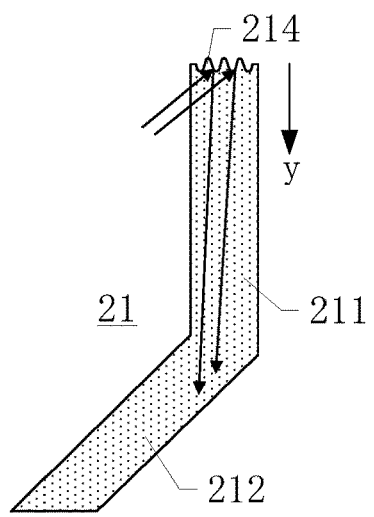
FIG. 6 illustrates an enlarged structural schematic of another exemplary first light guide portion in FIG. 1.

Optionally, referring to FIG. 1 and FIG. 6, a plurality of second protrusions 214 may be disposed on the side surface of the first sub-portion 211 away from the second sub-portion 212 in the second direction y.

In one embodiment, the plurality of the second protrusions 214 may be disposed on the side surface of the first sub-portion 211 away from the second sub-portion 212 in the second direction y. Therefore, after entering the first sub-portion 211, the light emitted from the light source 30 and the reflected light from the light guide points of the light guide plate 20 may be reflected into the second sub-portion 212 by the plurality of the second protrusions 214. On the one hand, the region where the first sub-portion 211 is located may be used as a part of the light-exiting surface of the backlight module, which may be advantageous for improving the luminance of the display device in the region where the first sub-portion 211 is located; on the other hand, the light in the second sub-portion 212 may be further improved, which may be advantageous for improving the luminance of the display device in the region where the second sub-portion 212 is located, thereby improving the luminance of the display device on the side of the notch 50 away from the light source 30.

It should be noted that, after the light enters the first sub-portion 211, only the paths of partial light reflected by the wave-shaped second protrusions 214 may be illustrated in FIG. 6. Moreover, by appropriately setting the number and shape of the second protrusions 214, the reflection paths of the light in the first sub-portion 211 may be further increased, so the luminance of the display device on the side of the notch 50 away from the light source 30 may be further improved. It can be understood that the plurality of the second protrusions 214 may also be arranged in other shapes, but the number and arrangement shape of the second protrusions 214 may not be specifically limited according to various embodiments of the present disclosure.

Figure 7:
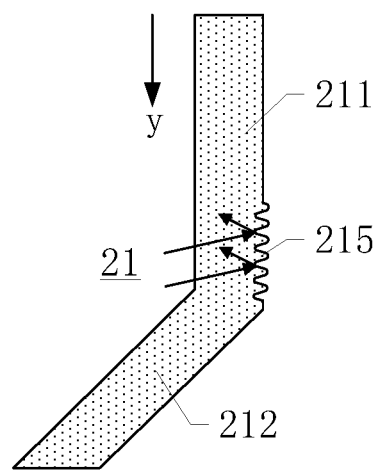
FIG. 7 illustrates an enlarged structural schematic of another exemplary first light guide portion in FIG. 1.

Optionally, referring to FIG. 1 and FIG. 7, a plurality of third protrusions 215 may be disposed on the side surface of the first sub-portion 211 adjacent to the first sidewall 121 in the first direction x.

In one embodiment, the plurality of the third protrusions 215 may be disposed on the side surface of the first sub-portion 211 adjacent to the first sidewall 121 in the first direction x. Therefore, after entering the first sub-portion 211, the light emitted from the light source 30 and the light reflected from the light guide points of the light guide plate 20 may be reflected by the plurality of the third protrusions 215, which may be advantageous for improving the luminance of the display device in the region where the first sub-portion 211 is located.

It should be noted that, after the light enters the first sub-portion 211, only the paths of partial light reflected by the wave-shaped third protrusions 215 are illustrated in FIG. 7. Moreover, by appropriately setting the number and shape of the third protrusions 215, the reflection paths of the light in the first sub-portion 211 may be further increased, so the luminance of the display device on the side of the notch 50 away from the light source 30 may be further improved. It can be understood that the plurality of the third protrusions 215 may also be arranged in other shapes, but the number and arrangement shape of the third protrusions 215 may not be specifically limited according to various embodiments of the present disclosure.

Figure 8:
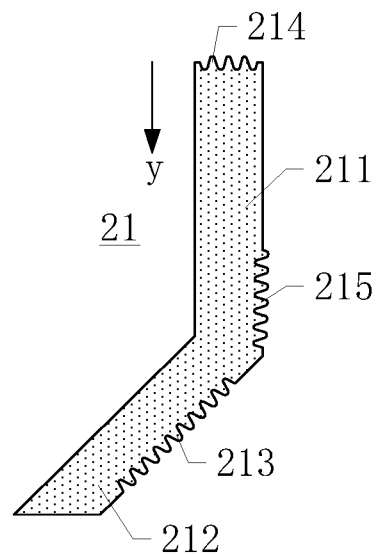
FIG. 8 illustrates an enlarged structural schematic of another exemplary first light guide portion in FIG. 1.

Optionally, referring to FIG. 1 and FIG. 8, the plurality of the first protrusions 213 may be disposed on the side surface of the second sub-portion 212 adjacent to the notch 50 in the second direction y; the plurality of the second protrusions 214 may be disposed on the side surface of the first sub-portion 211 away from the second sub-portion 212 in the second direction y; the plurality of the third protrusions 215 may be disposed on the side surface of the first sub-portion 211 adjacent to the first sidewall 121 in the first direction x. Therefore, the reflection paths of the light in the first light guide portion 21 may be increased through the first protrusions 213, the second protrusions 214, and the third protrusions 215, and the luminance of the display device on the side of the notch 50 away from the light source 30 may be improved.

It should be noted that the combination relationship of the first protrusions 213, the second protrusions 214, and the third protrusions 215, along with the protrusion number on the first light guide portion 21 may be configured according to actual situations or according to any other suitable situations without limitation. For example, for illustrative purposes, FIG. 8 shows an example of the first, second and third protrusions and a combination thereof, although any suitable configurations for the first, second, and third protrusions may be encompassed within the scope of the present disclosure.

Figure 9:
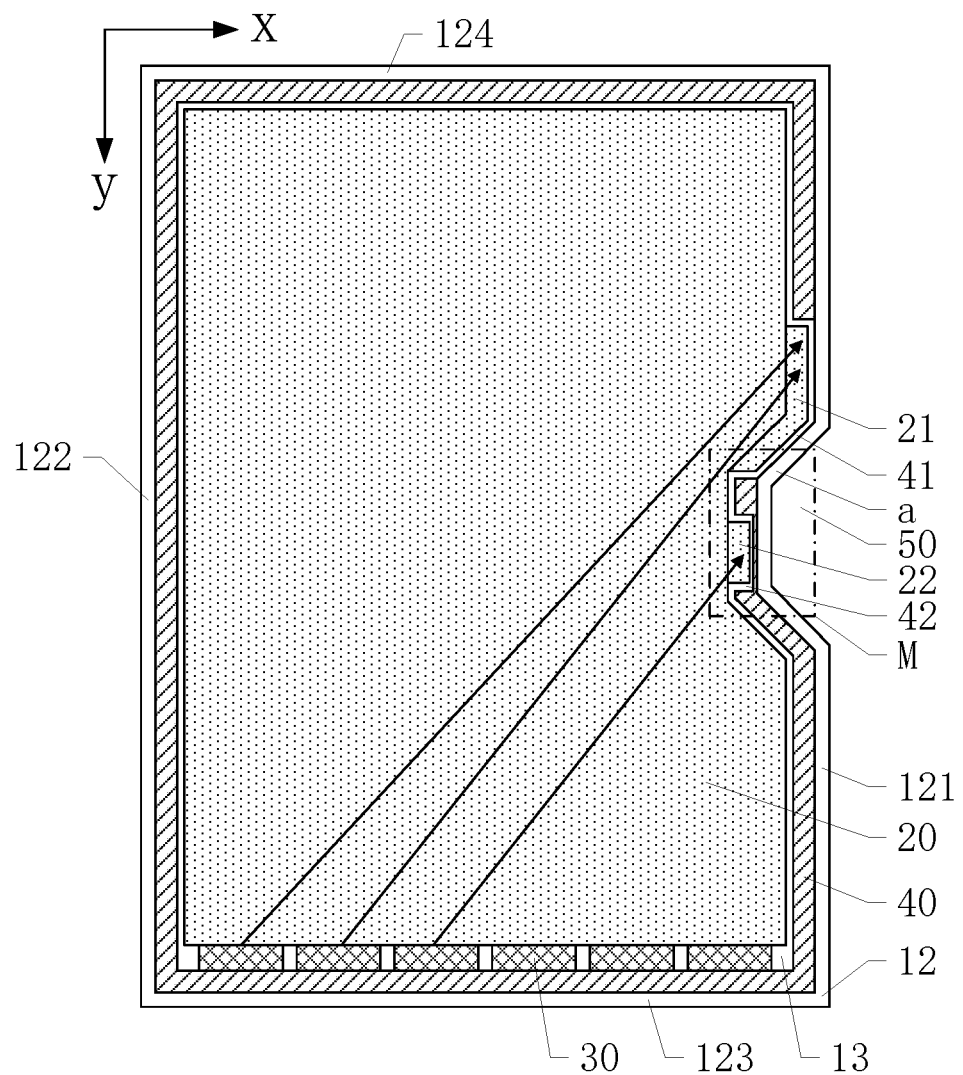
FIG. 9 illustrates a top-view structural schematic of another exemplary backlight module according to embodiments of the present disclosure.
Figure 10:
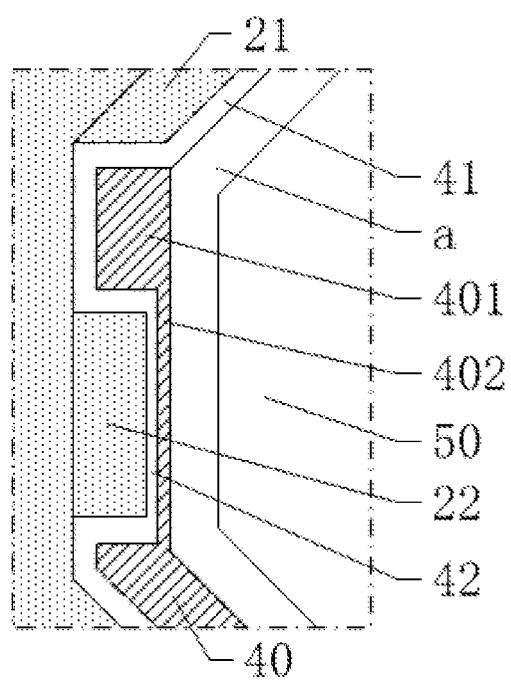
FIG. 10 illustrates an enlarged structural schematic of M region in FIG. 9.

In some optional embodiments, referring to FIG. 9 and FIG. 10, the adhesive frame 40 may also include at least one second gap 42, where the second gap 42 and the irregularly-shaped portion a may be adjacent in the first direction x. A second light guide portion 22 may be disposed in the second gap 42.

In one embodiment, the portion of the adhesive frame 40 other than the first gap 41 and the second gap 42 may still have better supporting strength to the mounted display panel (not shown). Partial light emitted from the light source 30 may enter the second gap 42 due to the presence of the second gap 42. Meanwhile, since the second light guide portion 22 is disposed in the second gap 42, the partial light entered may be transmitted and reflected through the second light guide portion 22, and the exiting surface may be formed on the side of the second light guide portion 22 away from the bottom plate 11. That is, the second light guide portion 22 may be enabled to emit light which may be provided as the backlight source to the display device for displaying pictures. Therefore, the second light guide portion 22 together with the light guide plate 20 may transmit and reflect the light emitted from the light source 30, thereby facilitating the expansion of the light-exiting surface of the backlight module, effectively improving the dark region effect at the second gap 42, and making more uniform luminance of the light-emitting region of the backlight module which may improve the display effect of the display device.

However, since the size of the second gap 42 is smaller than the size of the light guide plate 20, the ability of the second light guide portion 22 to transmit and reflect light may be relatively limited. In order to further improve the ability of the second light guide portion 22 to transmit and reflect light, the second light guide portion 22, like the first light guide portion 21, may be made of a material having a high light-transmitting efficiency, and the plurality of light guide points may be disposed inside the second light guide portion 22, which may not be specifically limited according to various embodiments of the present disclosure.

It should be noted that, in order to more clearly illustrate the technical solution in one embodiment, other structures are not illustrated in FIG. 9 and FIG. 10. Meanwhile, since the second light guide portion 22 and the light guide plate 20 have similar light transmitting effects, both may be filled with the same pattern. It can be understood that the second light guide portion 22 may be attached tightly to the light guide plate 20, or a certain gap may also be left between the second light guide portion 22 and the light guide plate 20, which may not be specifically limited according to various embodiments of the present disclosure.

The number of the second gap 42 may be set according to actual situations on the basis of satisfying the above-mentioned structural relationship, which may not be specifically limited according to various embodiments of the present disclosure. Only one second gap 42 is disposed as an example for description. For example, a portion of the adhesive frame 40 between the second gap 42 and the first gap 41 may be used as an isolation portion 401, so the two gaps may be separated by the isolation portion 401. The size of the isolation portion 401 may be relatively small, so a connection portion 402 may be disposed between the isolation portion 401 and the adhesive frame 40 to ensure that the isolation portion 401 have better stability in the accommodating cavity 13, that is, the presence of the second gap 42 may not cause the adhesive frame 40 to have a broken portion. During the manufacturing process of the adhesive frame 40, the isolation portion 401 and the connection portion 402 may be injection molded together with other portions of the adhesive frame 40, which may be advantageous for reducing the process difficulty of disposing the second gap 42. Of course, the isolation portion 401 may also ensure the stability in the accommodating cavity 13 by additionally disposing a supporting structure, which may not be specifically limited according to various embodiments of the present disclosure.

Figure 11:
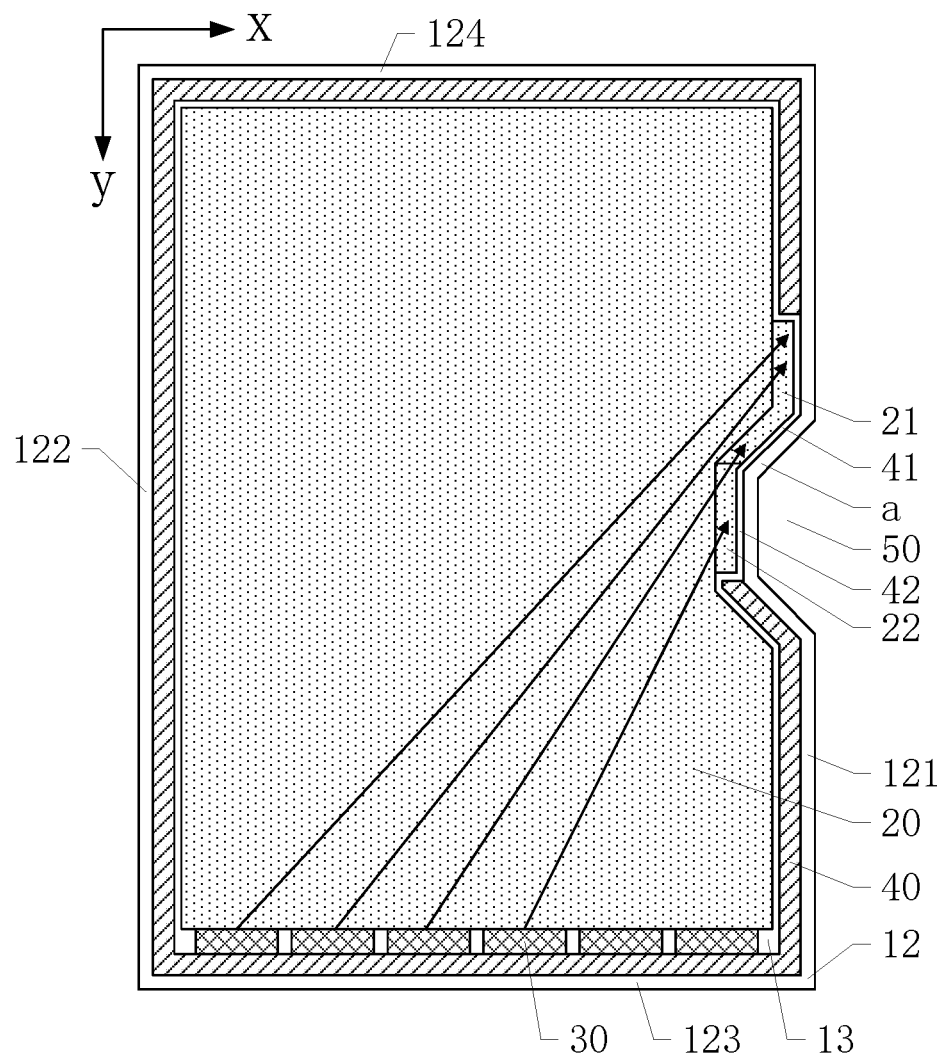
FIG. 11 illustrates a top-view structural schematic of another exemplary backlight module according to embodiments of the present disclosure.

Optionally, referring to FIG. 11, the second gap 42 and the first gap 41 may be connected, that is, the isolation portion 401 may not be disposed between the two gaps. Therefore, partial light may not be affected by the isolation portion 401 and may directly enter the first light guide portion 21 through the second light guide portion 22, which may be advantageous to increase the amount of exiting light of the first light guide portion 21 and expand the light-exiting surface of the backlight module, thereby effectively improving the dark region effect of the first gap 41 and the second gap 42, and the display effect of the display device.

Figure 12:
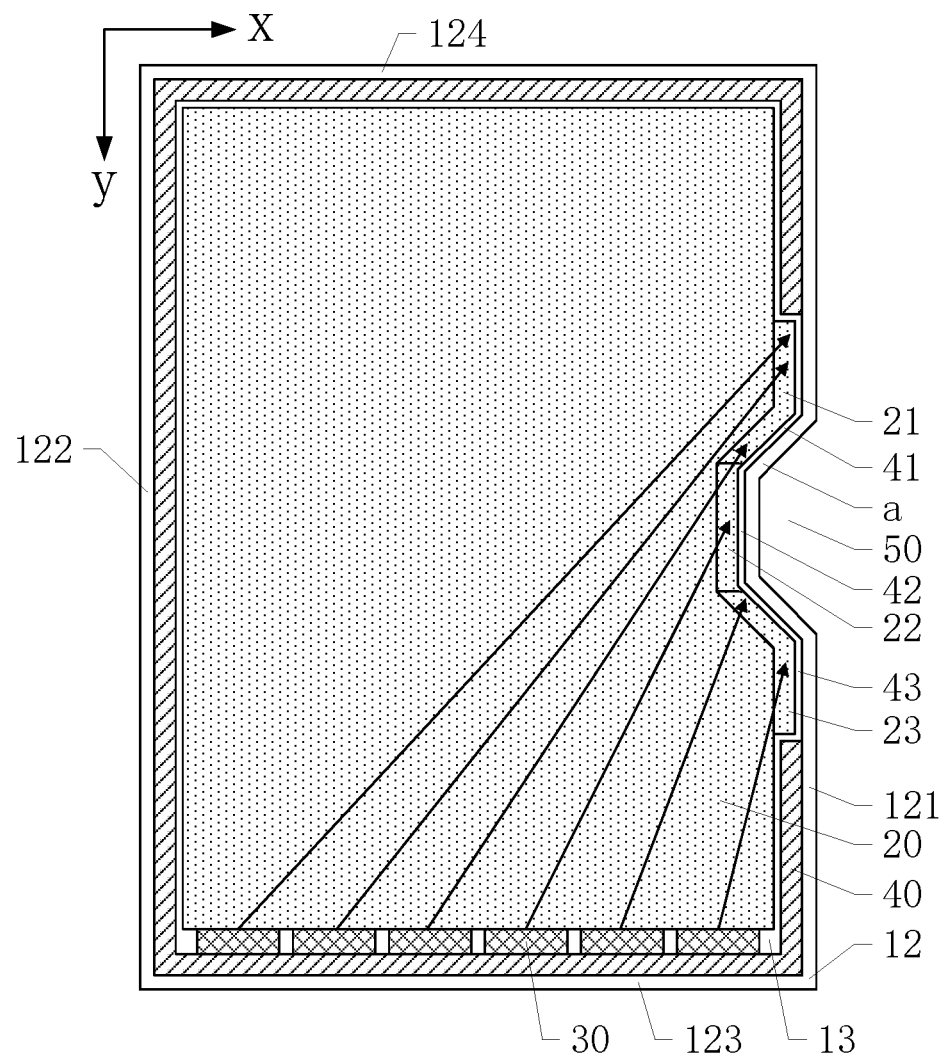
FIG. 12 illustrates a top-view structural schematic of another exemplary backlight module according to embodiments of the present disclosure.

In some optional embodiments, referring to FIG. 12, the adhesive frame 40 may also include at least one third gap 43, where the third gap 43 may be on a side of the notch 50 adjacent to the light source 30 in the second direction y. A third light guide portion 23 may be disposed in the third gap 43.

In one embodiment, the portion of the adhesive frame 40 other than the first gap 41, the second gap 42 and the third gap 43 may still have better supporting strength to the mounted display panel (not shown). At least one third gap 43 may be disposed in the adhesive frame 40. In the second direction y, the third gap 43 may be on the side of the notch 50 adjacent to the light source 30. The shape and number of the third gap 43 may be set according to actual situations, which may not be specifically limited according to various embodiments of the present disclosure. Although only one third gap 43 is disposed herein as an example for description, any number of third gaps may be encompassed within the scope of the present disclosure.

For example, partial light emitted from the light source 30, after transmitted by the light guide plate 20, may enter the third gap 43. Since the third light guide portion 23 is disposed in the third gap 43, the partial light entered may be transmitted and reflected through the third light guide portion 23, and the exiting surface may be formed on the side of the third light guide portion 23 away from the bottom plate 11. That is, the third light guide portion 23 may be enabled to emit light which may be provided as the backlight source to the display device for displaying pictures. Therefore, the third light guide portion 23 together with the light guide plate 20 may transmit and reflect the light emitted from the light source 30, thereby facilitating the expansion of the light-exiting surface of the backlight module.

In order to enable the third light guide portion 23 to have a certain ability to transmit and reflect light, the third light guide portion 23 may be made of a material having a high light-transmitting efficiency, and the plurality of light guide points may be disposed inside the third light guide portion 23. However, since the third gap 43 is on the side of the notch 50 adjacent to the light source 30, that is, the third gap 43 is closer to the light source 30 than the first gap 41 and the second gap 42, more light may easily enter the third gap 43, which may form a bright region of the backlight module where the third gap 43 is located. Therefore, the luminous intensity of the third light guide portion 23 may be controlled by adjusting the number and position of the light guide points in the third light guide portion 23, thereby effectively preventing the region where the third gap 43 is located from forming the bright region, and making more uniform luminance of the light-emitting region of the backlight module, which may improve the display effect of the display device. However, the control method of the luminous intensity of the third light guide portion 23 may not be specifically limited according to various embodiments of the present disclosure.

The third gap 43 and the second gap 42 may be separated by disposing the isolation portion 401 shown in FIG. 9. Of course, the two gaps may be connected, that is, the isolation portion 401 may not be disposed, so partial light may not be affected by the isolation portion 401 and may directly enter the second light guide portion 22 through the third light guide portion 23, which may be advantageous for increasing the amount of the light entering the second light guide portion 22.

It should be noted that, in order to more clearly illustrate the technical solution in one embodiment, other structures are not illustrated in FIG. 12. Meanwhile, since the third light guide portion 23 and the light guide plate 20 have similar light transmitting effects, both may be filled with the same pattern. It can be understood that the third light guide portion 23 may be attached tightly to the light guide plate 20, or a certain gap may also be left between the third light guide portion 23 and the light guide plate 20, which may not be specifically limited according to various embodiments of the present disclosure.

Figure 13:
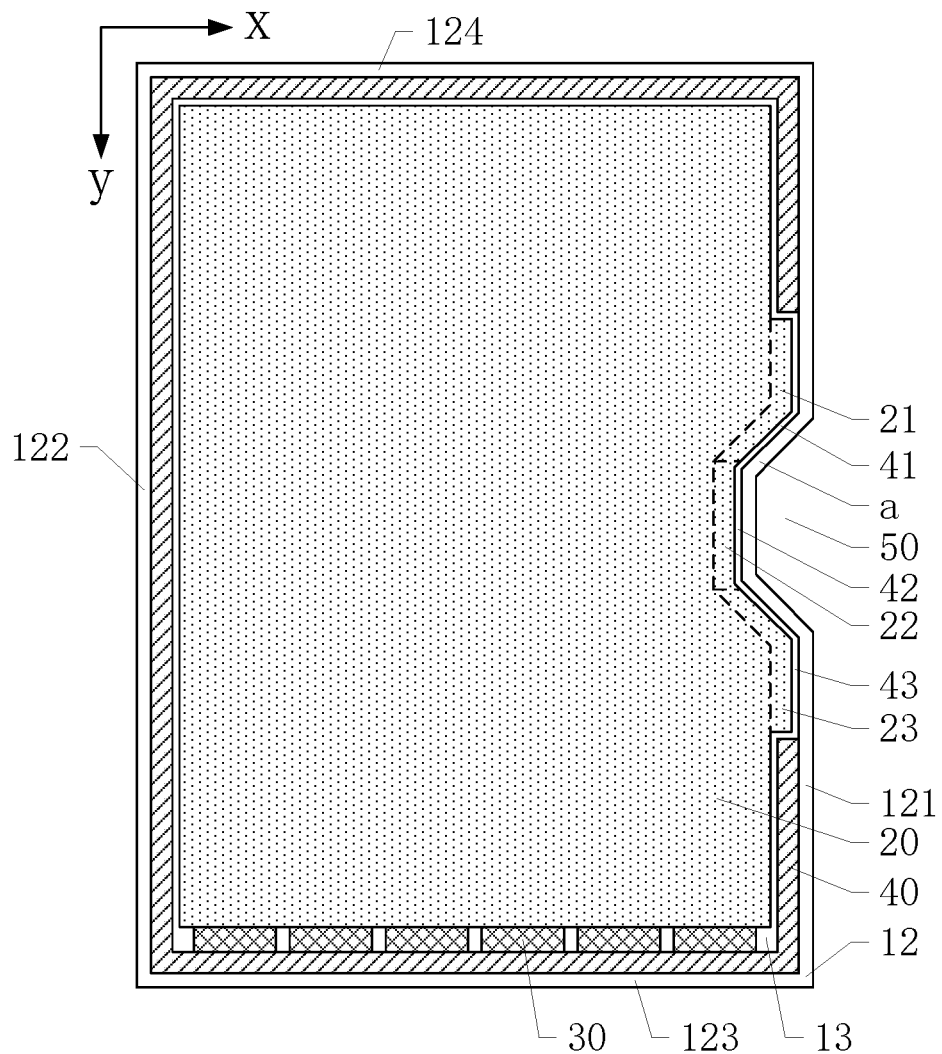
FIG. 13 illustrates a top-view structural schematic of another exemplary backlight module according to embodiments of the present disclosure.

In some optional embodiments, referring to FIG. 13, the first light guide portion 21, the second light guide portion 22 and the light guide plate 20 may be integrally formed. That is, the first light guide portion 21 and the second light guide portion 22 may be injection molded together with the light guide plate 20 to form the light guide structure of the light source 30. When the light guide plate 20 is mounted in the accommodating cavity 13, the first gap 41 and the second gap 42 may have a certain positioning effect on the first light guide portion 21 and the second light guide portion 22, so the manufacturing and the mounting operation of the light guide structure may be simple and convenient, and the production efficiency of the backlight module may be improved.

Optionally, still in FIG. 13, the third light guide portion 23 and the light guide plate 20 may be integrally formed. That is, the third light guide portion 23 may be injection molded together with the light guide plate 20 to form the light guide structure of the light source 30. When the light guide plate 20 is mounted in the accommodating cavity 13, the third gap 43 may have a certain positioning effect on the third light guide portion 23, so the manufacturing and the mounting operation of the light guide structure may be simple and convenient, and the production efficiency of the backlight module may be improved.

Optionally, still in FIG. 13, the first light guide portion 21, the second light guide portion 22, the third light guide portion 23 and the light guide plate 20 may be integrally formed. On the one hand, the manufacturing process difficulty of the light guide portions may be effectively reduced, which may ensure the stability in the accommodating cavity 13. On the other hand, the light entering and exiting paths between the light guide portions and the light guide plate 20 may be smoother, so the luminance of the light-emitting region of the backlight module may be more uniform, which may further improve the display effect of the display device.

Figure 14:
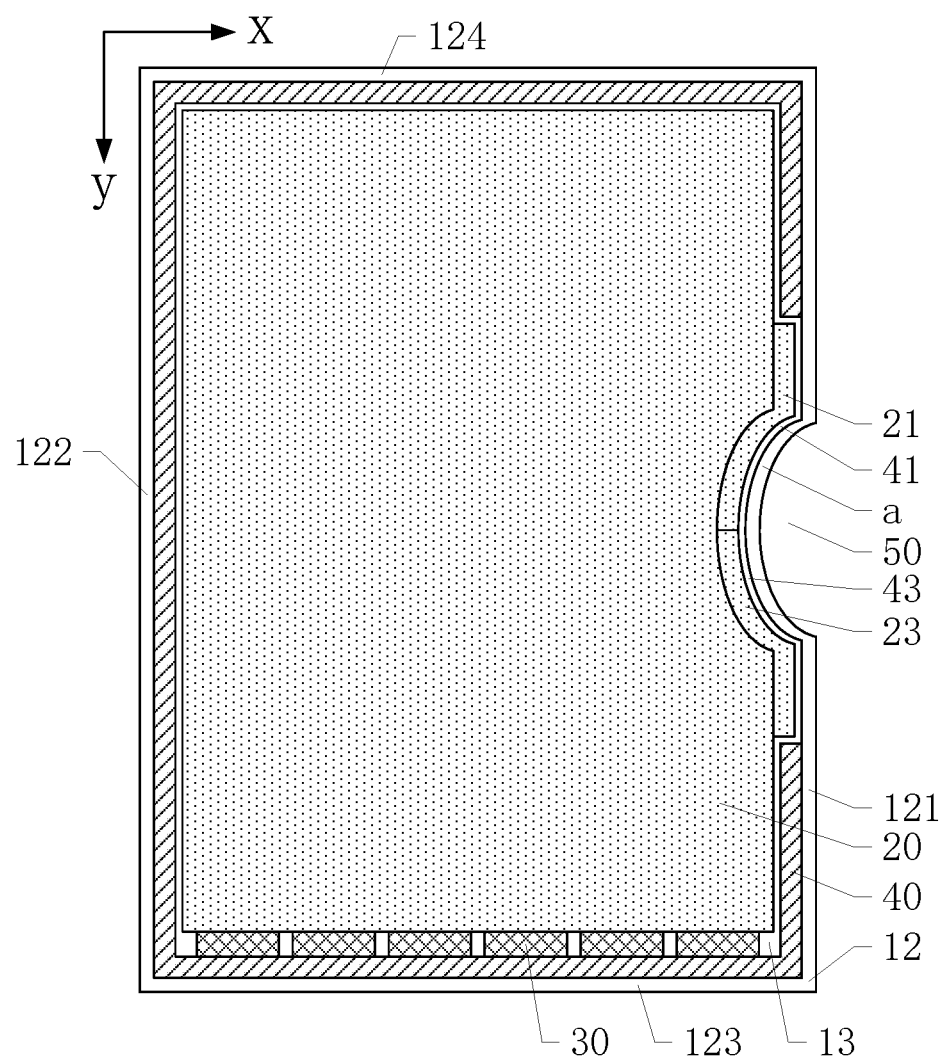
FIG. 14 illustrates a top-view structural schematic of another exemplary backlight module according to embodiments of the present disclosure.

In some optional embodiments, referring to FIG. 14, the shape of the notch 50 may be semi-elliptical. The adhesive frame 40 may include one first gap 41 and one third gap 43. The first gap 41 may be on the side of the third gap 43 away from the light source 30 in the second direction y. The first light guide portion 21 may be disposed in the first gap 41 and the third light guide portion 23 may be disposed in the third gap 43.

In the embodiment that the shape of the notch 50 is semi-elliptical, in order to increase the area of the light guide portion as much as possible, the shape of the gap for placing the light guide portion may match the shape of the notch 50. It is difficult to use the notch 50 to define the specific position of the side of the third gap 43 away from the light source 30 in the second direction y, so the second gap 42 may not be needed to be disposed between the first gap 41 and the third gap 43 as shown in FIG. 12. When being disposed symmetrically, the first light guide portion 21 and the third light guide portion 23 may be injection molded by a same mold, which may effectively reduce the manufacturing process difficulty of the light guide portions and save the process cost.

It should be noted that, the shape of the notch 50 is not limited to a semi-elliptical shape, for example, may be an approximate semi-elliptical notch such as a partial elliptical notch. In such the approximate semi-elliptical notch, the first gap 41 and the third gap 43 may still be only disposed and by disposing the light guide portions in the gaps, the display effect of the display device may still be improved.

Figure 15:
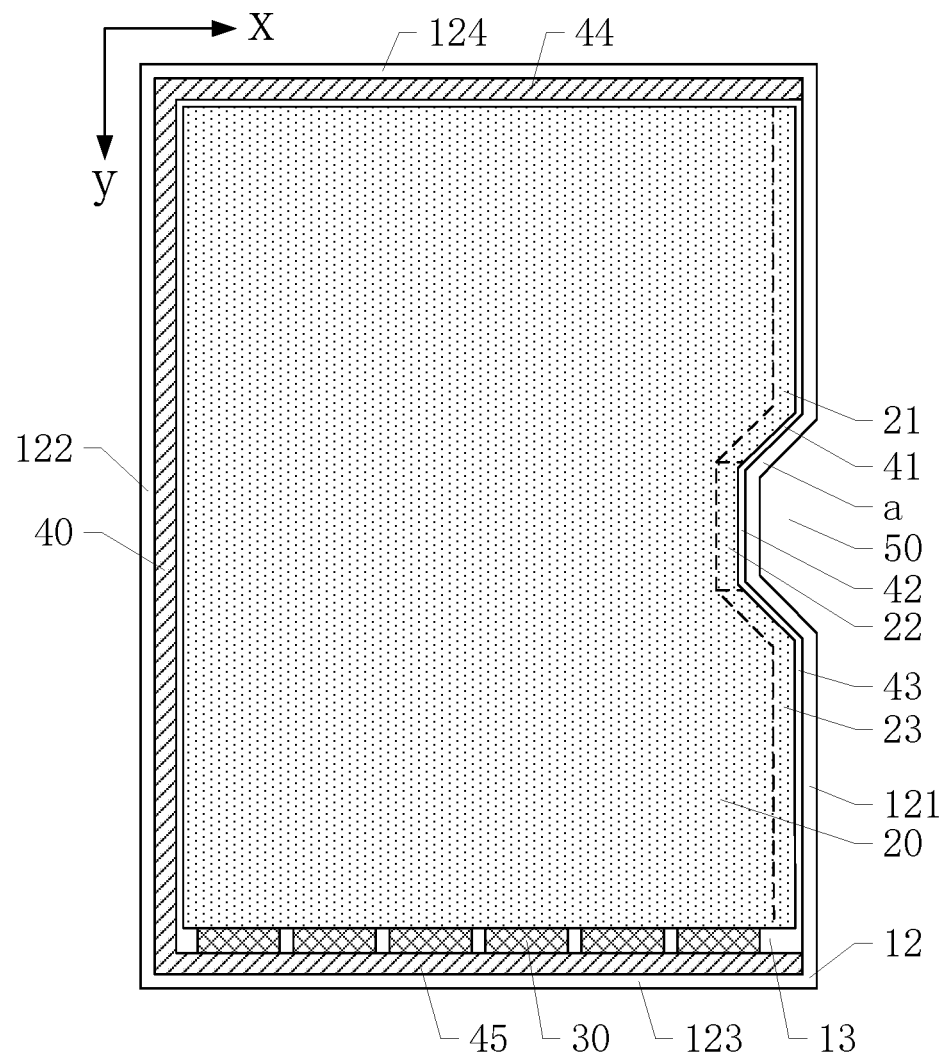
FIG. 15 illustrates a top-view structural schematic of another exemplary backlight module according to embodiments of the present disclosure.

In some optional embodiments, referring to FIG. 15, the adhesive frame 40 may include a first frame portion 44 and a second frame portion 45. The first frame portion 44 may be between the fourth sidewall 124 and the side of the light guide plate 20 away from the light source 30. The second frame portion 45 may be between the third sidewall 123 and the side of the light guide plate 20 adjacent to the light source 30. The side of the first gap 41 away from the notch 50 may extend to the first frame portion 44 in the second direction y, and the side of the third gap 43 away from the notch 50 may extend to the second frame portion 45 in the second direction y.

In one embodiment, the side of the first gap 41 away from the notch 50 may extend to the first frame portion 44 and the side of the third gap 43 away from the notch 50 may extend to the second frame portion 45, so a side of the adhesive frame 40 adjacent to the first sidewall 121 in the first direction x may be completely removed. In such way, the light emitted from the light guide plate 20 may directly enter the gaps without being affected by the adhesive frame 40, and the light-exiting surface of the backlight module may be further expanded by the first light guide portion 21, the second light guide portion 22 and the third light guide portion 23, which may improve the display effect of the display device.

Figure 16:
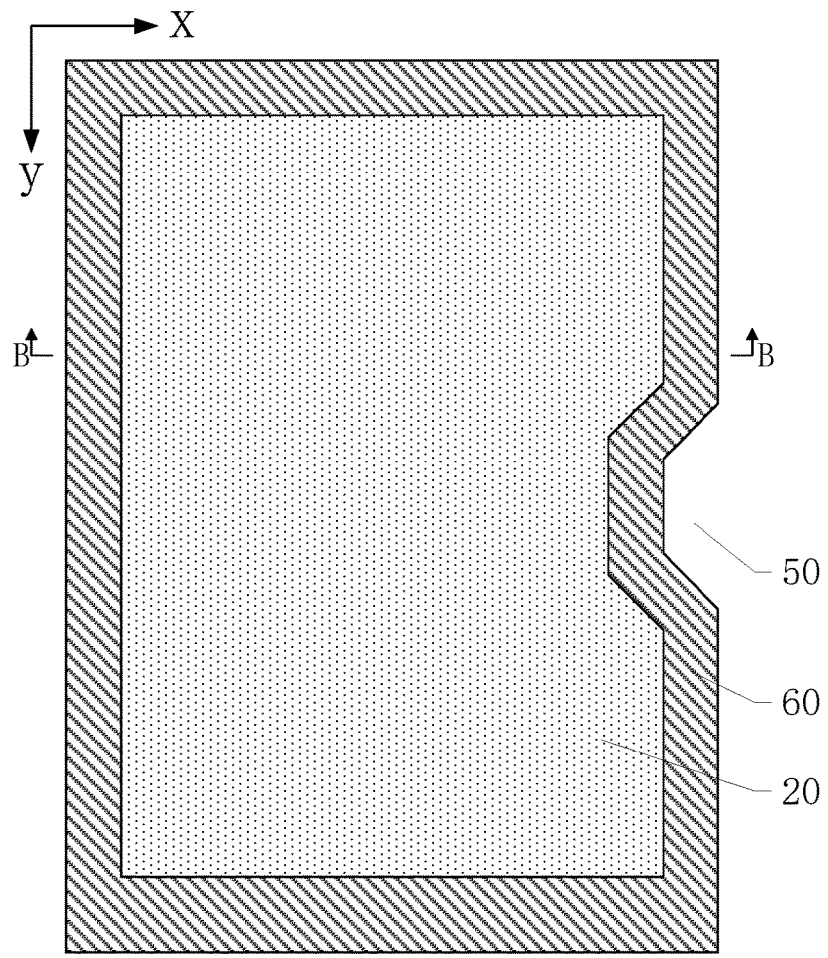
FIG. 16 illustrates a top-view structural schematic of another exemplary backlight module according to embodiments of the present disclosure.
Figure 17:
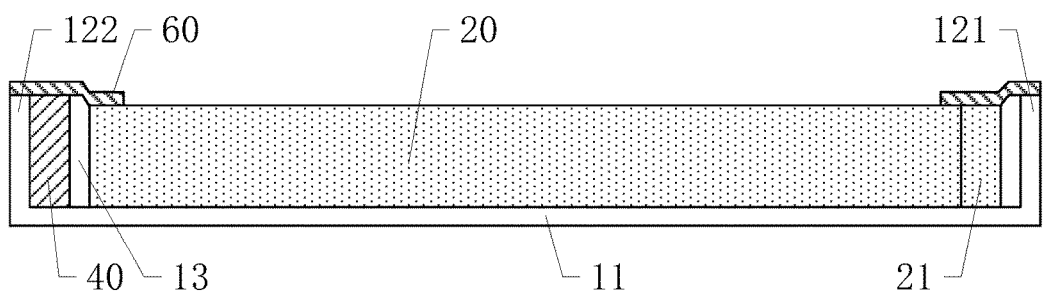
FIG. 17 illustrates a cross-sectional structural schematic along B-B direction in FIG. 16.

In some optional embodiments, referring to FIG. 16 and FIG. 17, the backlight module may further include a light shielding tape 60. The light shielding tape 60 may at least partially overlap each of the light guide plate 20 and the first light guide portion 21 in a direction perpendicular to the plane of the bottom plate 11.

In one embodiment, there may be an overlapping portion between the orthographic projection of the light-shielding tape 60 on the plane of the bottom plate 11 and the orthographic projection of the light guide plate 20 and the first light guide portion 21, so the light-shielding tape 60 may block the light from the edge of the backlight module, which may prevent light leakage at the edge of the backlight module to affect the display effect of the display device. The adhesive frame 40 and the sidewall 12 may better support the light-shielding tape 60. The light-shielding tape 60 may be directly attached to the surface of the light guide plate 20. Of course, other film layers may be disposed between the light-shielding tape 60 and the light guide plate 20, and the light-shielding tape 60 may be attached to the surface of the film layers, which may not be specifically limited according to various embodiments of the present disclosure.

It should be noted that, the light-shielding tape 60 in FIG. 16 may be disposed based on any backlight module of the above-mentioned embodiments, and the cross-sectional line B-B passes the first light guide portion 21. FIG. 17 is the cross-sectional structural schematic along the cross-sectional line B-B. Meanwhile, in order to more clearly illustrate the technical solution in one embodiment, other structures are not illustrated in FIG. 16 and FIG. 17.

Figure 18:
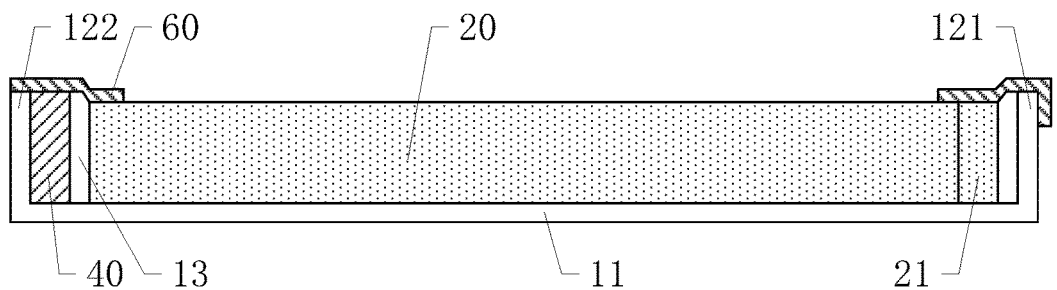
FIG. 18 illustrates another cross-sectional structural schematic along the B-B direction in FIG. 16.

Optionally, referring to FIG. 15, FIG. 16 and FIG. 18, the light-shielding tape 60 may extend to the side surface of the first sidewall 121 away from the accommodating cavity 13.

Since the side of the adhesive frame 40 adjacent to the first sidewall 121 in the first direction x may be completely removed, the light-exiting surface of the backlight module may be better expanded. However, there may be only the overlapping portion between the orthographic projection of the light-shielding tape 60 on the plane of the bottom plate 11 and the orthographic projection of the light guide plate 20 and the first light guide portion 21, that is, the support of the adhesive frame 40 may be absent, so the light-shielding tape 60 may be easily peeled off from the side of the first sidewall. In one embodiment, since the light-shielding tape 60 may extend to the side surface of the first sidewall 121 away from the accommodating cavity 13, the light-shielding tape 60 may have more attaching area with the first sidewall 121 from the side away from the accommodating cavity 13, which may effectively prevent peeling of the light-shielding tape 60 from the first sidewall 121.

The attaching area between the light-shielding tape 60 and the side surface of the first sidewall 121 away from the accommodating cavity 13 may be set according to actual situations, which may not be specifically limited according to various embodiments of the present disclosure. It should be noted that, in one embodiment, the disposing method of the light-shielding tape 60 may be suitable for any backlight module in the above-mentioned embodiments. In one embodiment, only the backlight module with the light-shielding tape 60 disposed in FIG. 15 may be used as an example for description.

Figure 19:
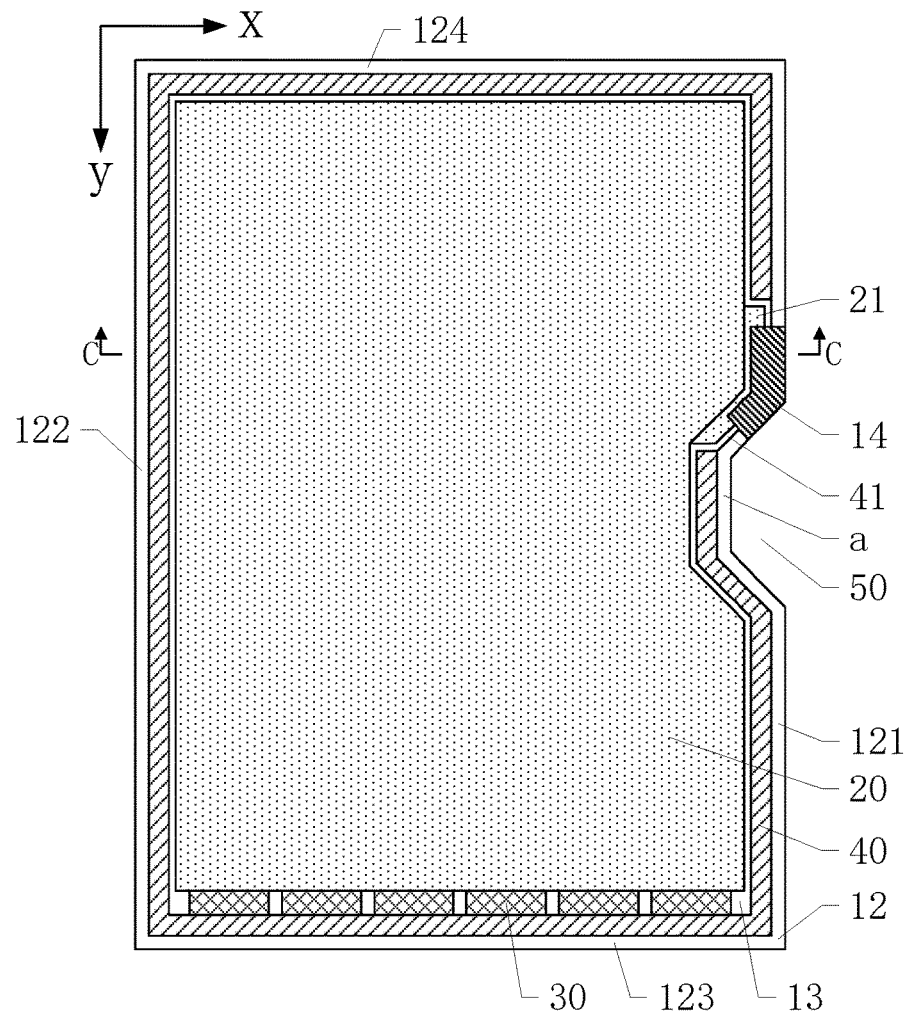
FIG. 19 illustrates a top-view structural schematic of another exemplary backlight module according to embodiments of the present disclosure.
Figure 20:
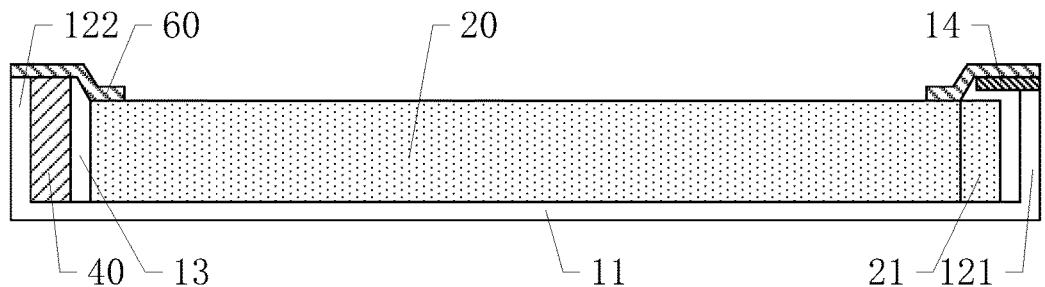
FIG. 20 illustrates a cross-sectional structural schematic along C-C direction in FIG. 19.

Optionally, referring to FIG. 19 and FIG. 20, the metal frame 10 may further include at least one bent portion 14. The bent portion 14 may be on the side of the first sidewall 121 away from the bottom plate 11 and may extend in the direction toward the accommodating cavity 13. In the direction perpendicular to the plane of the bottom plate 11, the bent portion 14 and the first gap 41 may partially overlap, and the light-shielding tape 60 and the bent portion 14 may also partially overlap.

In one embodiment, the bent portion 14 may be on the side of the first sidewall 121 away from the bottom plate 11 and may extend in the direction toward the accommodating cavity 13. That is, the bent portion 14 may be formed by bending the side of the first sidewall 121 away from the bottom plate 11 toward the accommodating cavity 13 using a bending process. The bent portion 14 and the first sidewall 121 may be an integrally formed structure. Of course, the bent portion 14 may be fixed on the side of the first sidewall 121 away from the bottom plate 11 by a method including welding, attaching, etc., as long as the bent portion 14 may extend toward the accommodating cavity 13, which may not be specifically limited according to various embodiments of the present disclosure.

The portion of the adhesive frame 40 other than the first gap 41 may have a certain supporting strength to the mounted display panel. However, the light-shielding tape 60 may not be attached to the adhesive frame 40 at the first gap 41, so the light-shielding tape 60 and the bent portion 14 may partially overlap by setting at least partial overlapping of the bent portion 14 and the first gap 41 in the direction perpendicular to the plane of the bottom plate 11. In such way, the attaching area of the light-shielding tape 60 on the backlight module may be increased and the light-shielding tape 60 may not be easily peeled off, thereby effectively reducing the malfunction of the display device due to the peeling of the light-shielding tape 60.

Figure 21:
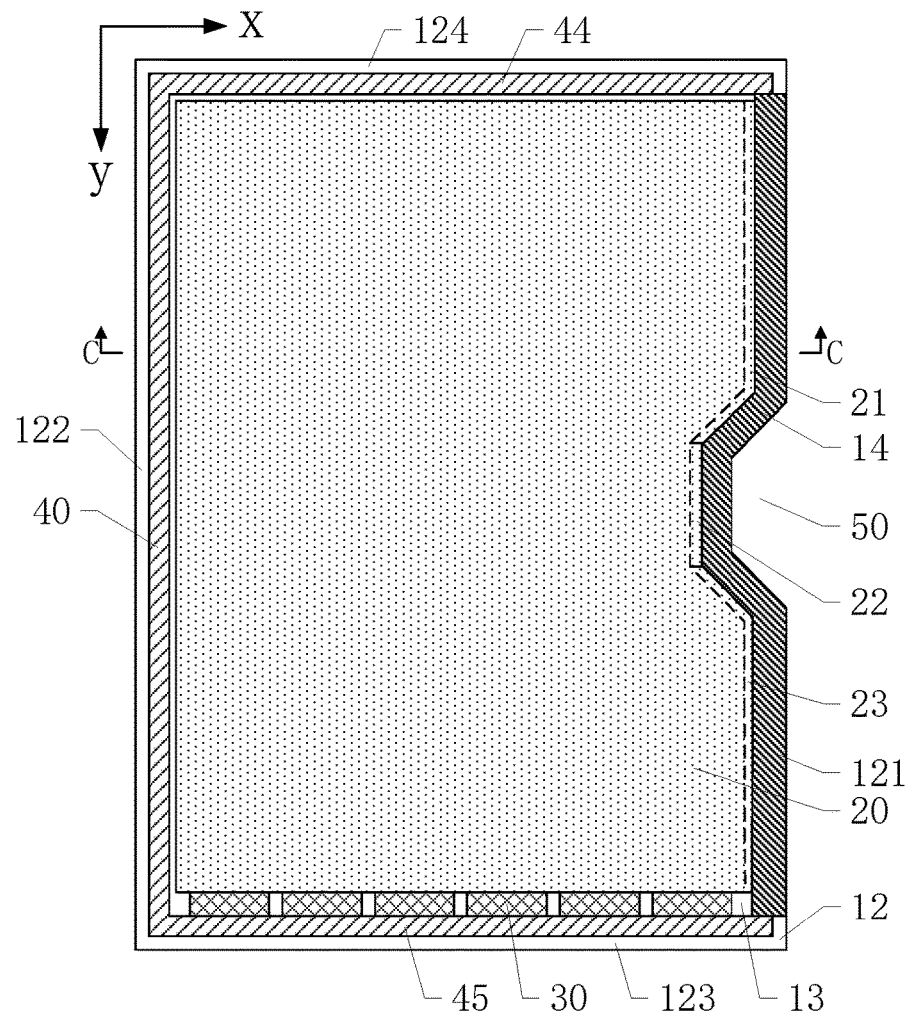
FIG. 21 illustrates a top-view structural schematic of another exemplary backlight module according to embodiments of the present disclosure.

Optionally, referring to FIG. 15, FIG. 20 and FIG. 21, in the second direction y, the side of the first gap 41 away from the notch 50 may extend to the first frame portion 44, and the side of the third gap 43 away from the notch 50 may extend to the second frame portion 45. In the direction perpendicular to the plane of the bottom plate 11, the bent portion 14 may partially overlap with each of the first gap 41, the second gap 42 and the third gap 43, and the light-shielding tape 60 and the bent portion 14 may partially overlap.

The side of the adhesive frame 40 adjacent to the first sidewall 121 in the first direction x may be completely removed, but this side may not provide support for the mounted display panel (not shown) through the adhesive frame 40, so the display panel may have a risk of being offset toward the light guide plate 20 on the side of the adhesive frame 40 adjacent to the first sidewall 121, that is, the light guide plate 20 may be easily damaged. In one embodiment, by disposing the bent portion 14, the bent portion 14 may partially overlap with each of the first gap 41, the second gap 42 and the third gap 43, thereby providing stable supporting strength to the display panel jointly by the bent portion 14, the adhesive frame 40 and the sidewall 12.

Meanwhile, the light-shielding tape 60 and the bent portion 14 may be also at least partially overlap, that is, the light-shielding tape 60 may have more attaching area with the metal frame 10, which may effectively prevent the light-shielding tape 60 from peeling from the metal frame 10.

It should be noted that, in order to more clearly illustrate the technical solution in one embodiment, other structures such as the light-shielding tape 60 are not illustrated in FIG. 19 and FIG. 21. The cross-sectional structural schematic along the cross-sectional line C-C in FIG. 21 may be same as shown in FIG. 20 and the disposing method of the light-shielding tape 60 on the backlight module may be same as shown in FIG. 16, which may not be described in detail in one embodiment.

Figure 22:
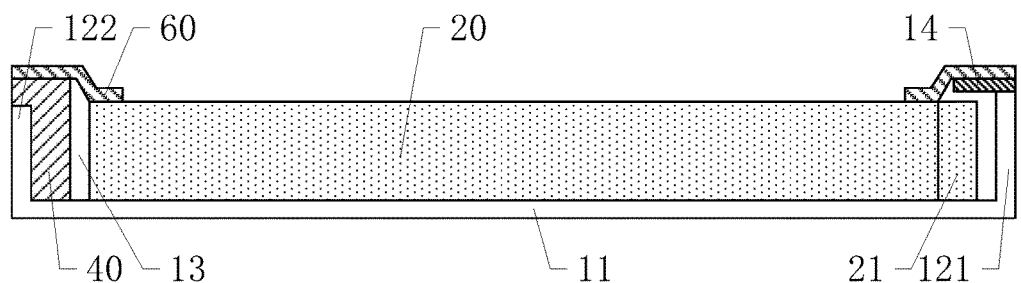
FIG. 22 illustrates a cross-sectional structural schematic along C-C direction in FIG. 21.

Optionally, referring to FIG. 19, and FIG. 22, the height of the adhesive frame 40 may be greater than or equal to the height of any of the first sidewall 121, the second sidewall 122, the third sidewall 123 and the fourth sidewall 124 in the direction perpendicular to the plane of the bottom plate 11.

In one embodiment, the height of the adhesive frame 40 may be greater than or equal to the height of other sidewalls in the direction perpendicular to the plane of the bottom plate 11, so the width of the adhesive frame 40 away from the bottom plate 11 along the first direction x may be further expanded. Meanwhile, the orthographic projection of the adhesive frame 40 away from the side of the bottom plate 11 may completely overlap with the second sidewall 122, so the contact area between the light-shielding tape 60 and the adhesive frame 40 may be further increased, which may effectively prevent the light-shielding tape 60 from peeling from the adhesive frame 40.

Figure 23:
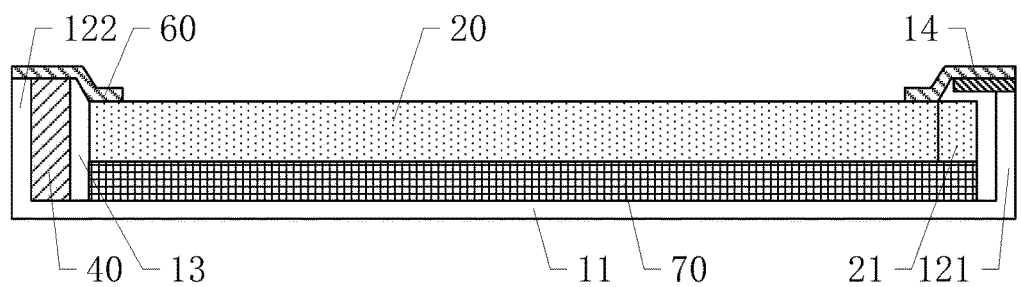
FIG. 23 illustrates another cross-sectional structural schematic along C-C direction in FIG. 21.

In some optional embodiments, referring to FIG. 19 and FIG. 23, the backlight module may further include a reflector 70 which may be on the side of the light guide plate 20 and the first light guide portion 21 adjacent to the bottom plate 11.

In one embodiment, the reflector 70 may be disposed on the side of the light guide plate 20 and the first light guide portion 21 adjacent to the bottom plate 11, and the light overflowing from this side may be re-reflected by the reflector 70 to the light guide plate 20 and the first light guide portion 21, which may effectively improve the utilization rate of light.

Figure 24:
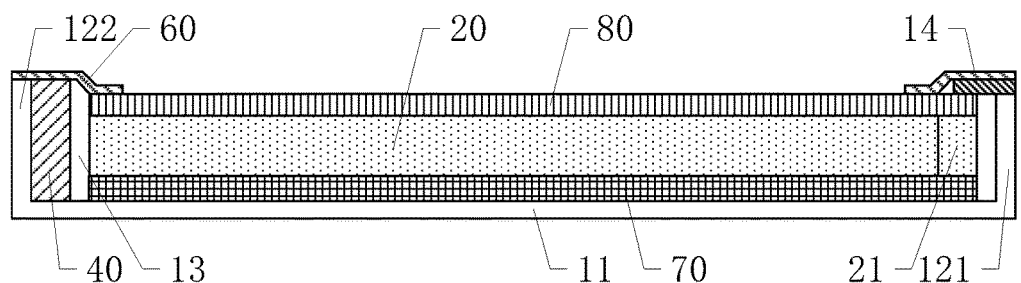
FIG. 24 illustrates another cross-sectional structural schematic along C-C direction in FIG. 21.

Optionally, referring to FIG. 19 and FIG. 24, the backlight module may further include an optical film set 80, which may be on the side of the light guide plate 20 and the first light guide portion 21 away from the bottom plate 11.

In one embodiment, the optical film set 80 may be disposed on the side of the light guide plate 20 and the first light guide portion 21 away from the bottom plate 11, and may process the light emitted from the light guide plate 20, which may enable the light emitted from the exiting surface of the backlight module to be relatively strong and uniform, and may be advantageous to improve the display effect of the display device.

The optical film set 80 may be a multi-layer structure, for example, including two layers of the light enhancement sheets and one layer of the diffuser, etc. The light enhancement sheet may improve the light front greyscale and the diffuser may atomize the light to make the light more uniform, which may not be specifically limited according to various embodiments of the present disclosure.

After the light emitted from the light source 30 enters the light guide plate 20 and the first light guide portion 21, partial light may be reflected to the diffuser and the light enhancement sheet by the light guide points, and may finally enter the display panel; and the other partial light may be re-reflected to the light guide plate 20 and the first light guide portion 21 by the reflector 70, and then may be reflected to the diffuser and the light enhancement sheet by the light guide points and may finally enter the display panel.

The present disclosure also provides a display device, including the backlight module provided by the present disclosure.

Figure 25:
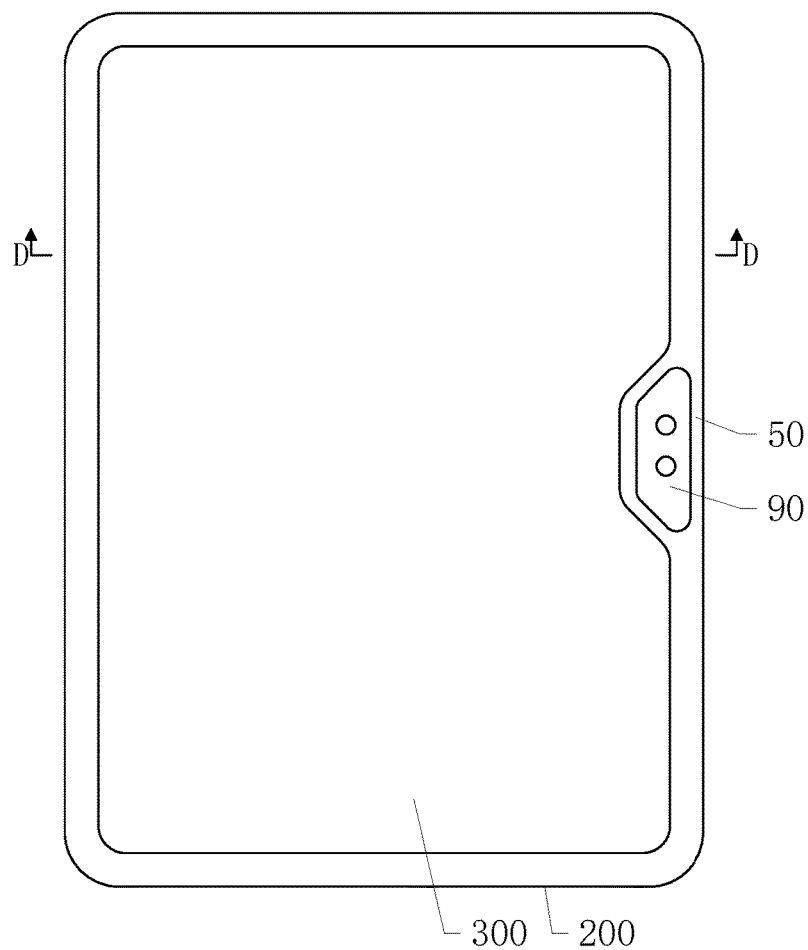
FIG. 25 illustrates a structural schematic of an exemplary display device according to embodiments of the present disclosure.
Figure 26:
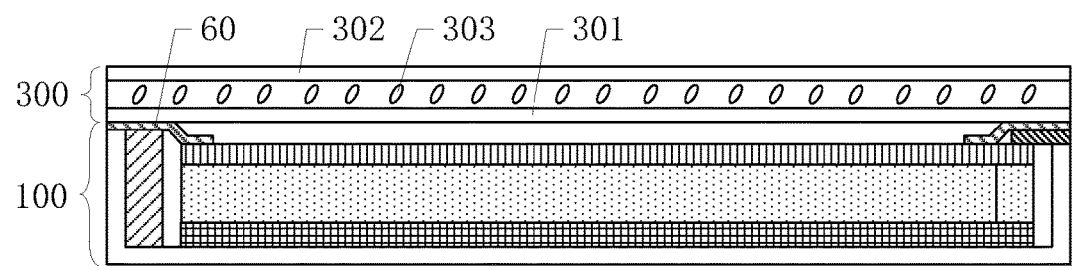
FIG. 26 illustrates a cross-sectional structural schematic along D-D direction in FIG. 25.

Referring to FIG. 25 and FIG. 26, a display device 200 of the present disclosure may include a backlight module 100 which may be provided by any of the above-mentioned embodiments of the present disclosure. A mobile phone may be only used as an example for description to illustrate the display device 200 in FIG. 25. It should be understood that the display device 200 provided by the embodiments of the present disclosure may also be a display device having a display function, such as a tablet computer, a television, an in-vehicle display, etc., which may not be specifically limited according to various embodiments of the present disclosure. The display device provided by the embodiments of the present disclosure may have beneficial effects of the display panel provided by the embodiments of the present disclosure, and the details may refer to the detailed description of the display panel in the above-mentioned embodiments, which may not be described in one embodiment herein.

Optionally, referring to FIG. 25 and FIG. 26, the display device 200 may further include a camera 90 which may be disposed in the notch 50 of the backlight module 100.

In one embodiment, the camera 90 may be mounted in the notch 50 of the backlight module 100, which may meet various functional requirements and may be advantageous to improve practicality of the display device 200. Of course, when the notch 50 has sufficient space, other functional devices such as microphones, light-emitting devices, etc. may also be disposed in the notch 50, which may not be specifically limited according to various embodiments of the present disclosure.

Optionally, referring to FIG. 25 and FIG. 26, the display device 200 may further include a display panel 300. The display panel 300 may include an array substrate 301, an opposite substrate 302, and a liquid crystal layer 303. The array substrate 301 and the opposite substrate 302 may be disposed opposite to each other. The liquid crystal layer 303 may be between the array substrate 301 and the opposite substrate 302.

In one embodiment, the display panel 300 is on the light-exiting surface side of the backlight module 100, that is, the backlight module 100 may be fixed with the display panel 300 by the light-shielding tape 60, so the backlight module 100 may provide sufficient light to the display panel 300. In the display panel 300, the deflection degree of liquid crystal molecules in the liquid crystal layer 303 may be controlled by controlling the electric field of the edge of the array substrate 301, and the light transmittance of the emitted light from the backlight module 100 in the liquid crystal layer 303 may be controlled by the deflection degree of the liquid crystal molecules, thereby realizing the picture display function of the display panel 300.

From the above-mentioned embodiments, it can be noted that the backlight module and the display device provided by the present disclosure may achieve at least the following beneficial effects.

The metal frame may be used to accommodate components such as light guide plates and light sources, etc. and the irregularly-shaped portion may be disposed on the first sidewall of the metal frame. Therefore, the notch may be formed through the irregularly-shaped portion and devices such as cameras, etc. may be mounted in the region where the notch is located, which may meet various functional and visual requirements. The first light guide portion may be disposed in the first gap of the adhesive frame. On the one hand, the first light guide portion together with the light guide plate may transmit light, which may be advantageous to expand the light-exiting surface of the backlight module. On the other hand, although the first gap is on the side of the notch away from the light source, the amount of exiting light from the first gap may be increased through the first light guide portion, thereby effectively preventing the dark region from being formed at the first gap, improving the uniformity of the luminance of the light-emitting region of the backlight module, and improving the luminance unevenness of the display device and the display effect of the display device.

Of course, any of the products embodying the present disclosure does not necessarily need meet all of the technical effects described above at the same time.

The details of the present disclosure have been described through the embodiments provided above. However, those skilled in the art should understand that the disclosed embodiments are exemplary only and are not intended to limit the scope of the present disclosure. Those skilled in the art should understand that the disclosed embodiments can be modified without departing from the scope and principles of the present disclosure. The scope of the present disclosure is defined by the appended claims and their equivalents.

What is claimed is:

1. A backlight module, comprising:
  a metal frame, a light guide plate, a light source, an adhesive frame, and a notch, wherein:
  the metal frame includes a bottom plate and a sidewall, wherein the sidewall includes a first sidewall, a second sidewall, a third sidewall, and a fourth sidewall; the first sidewall and the second sidewall are on opposite sides of the bottom plate along a first direction; the third sidewall and the fourth sidewall are on opposite sides of the bottom plate along a second direction; and an accommodating cavity is formed between the bottom plate, the first sidewall, the second sidewall, the third sidewall, and the fourth sidewall, wherein the first direction intersects the second direction;

the first sidewall includes at least one irregularly-shaped portion, and the irregularly-shaped portion protrudes toward an inside of the accommodating cavity to form the notch;

the light guide plate, the light source and the adhesive frame are all disposed in the accommodating cavity, wherein the adhesive frame is between the light guide plate and the sidewall; the light source and the light guide plate are arranged along the second direction; and the light source is between the light guide plate and the third sidewall; and the adhesive frame includes at least one first gap, the first gap is on a side of the notch away from the light source in the second direction, and a first light guide portion is disposed in the first gap.

2. The backlight module according to claim 1, wherein:
the first light guide portion includes a first sub-portion and a second sub-portion;
the second sub-portion is on the side of the notch away from the light source; and
the first sub-portion extends along the second direction and is on a side of the second sub-portion away from the notch.

3. The backlight module according to claim 2, wherein:
a plurality of first protrusions is disposed on a side surface of the second sub-portion adjacent to the notch in the second direction.

4. The backlight module according to claim 2, wherein:
a plurality of second protrusions is disposed on a side surface of the first sub-portion away from the second sub-portion in the second direction.

5. The backlight module according to claim 2, wherein:
a plurality of third protrusions is disposed on a side surface of the first sub-portion adjacent to the first sidewall in the second direction.

6. The backlight module according to claim 1, wherein:
the adhesive frame further includes at least one second gap, wherein the second gap and the irregularly-shaped portion are adjacent in the first direction; and
a second light guide portion is disposed in the second gap.

7. The backlight module according to claim 6, wherein:
each of the first light guide portion and the second light guide portion is integrally formed with the light guide plate.

8. The backlight module according to claim 1, wherein:
the adhesive frame further includes at least one third gap, wherein the third gap is on the side of the notch adjacent to the light source in the second direction; and
a third light guide portion is disposed in the third gap.

9. The backlight module according to claim 8, wherein:
the third light guide portion is integrally formed with the light guide plate.

10. The backlight module according to claim 8, wherein:
the adhesive frame includes a first frame portion and a second frame portion, wherein the first frame portion is between a side of the light guide plate away from the light source and the fourth sidewall; and the second frame portion is between a side of the light guide plate adjacent to the light source and the third sidewall; and
a side of the first gap away from the notch extends to the first frame portion in the second direction, and a side of the third gap away from the notch extends to the second frame portion in the second direction.

11. The backlight module according to claim 1, further including:
a light shielding tape, wherein the light shielding tape at least partially overlaps each of the light guide plate and the first light guide portion in a direction perpendicular to a plane of the bottom plate.

12. The backlight module according to claim 11, wherein:
the metal frame further includes at least one bent portion, wherein the bent portion is on the side of the first sidewall away from the bottom plate and extends in the direction toward the accommodating cavity; and
the bent portion at least partially overlaps the first gap, and the light-shielding tape also partially overlaps the bent portion in the direction perpendicular to the plane of the bottom plate.

13. The backlight module according to claim 1, wherein:
a height of the adhesive frame is greater than or equals to a height of any of the first sidewall, the second sidewall, the third sidewall, and the fourth sidewall in a direction perpendicular to a plane of the bottom plate.

14. The backlight module according to claim 1, further including:
a reflector, located on a side of the light guide plate and the first light guide portion, adjacent to the bottom plate.

15. The backlight module according to claim 1, further including:
an optical film set, located on a side of the light guide plate and the first light guide portion, away from the bottom plate.

16. A display device, comprising:
a backlight module, including:
a metal frame, a light guide plate, a light source, an adhesive frame, and a notch,
wherein:
the metal frame includes a bottom plate and a sidewall, wherein the sidewall includes a first sidewall, a second sidewall, a third sidewall, and a fourth sidewall; the first sidewall and the second sidewall are on opposite sides of the bottom plate along a first direction; the third sidewall and the fourth sidewall are on opposite sides of the bottom plate along a second direction; and an accommodating cavity is formed between the bottom plate, the first sidewall, the second sidewall, the third sidewall, and the fourth sidewall, wherein the first direction intersects the second direction;
the first sidewall includes at least one irregularly-shaped portion, and the irregularly-shaped portion protrudes toward an inside of the accommodating cavity to form the notch;
the light guide plate, the light source and the adhesive frame are all disposed in the accommodating cavity, wherein the adhesive frame is between the light guide plate and the sidewall; the light source and the light guide plate are arranged along the second direction; and the light source is between the light guide plate and the third sidewall; and
the adhesive frame includes at least one first gap, the first gap is on a side of the notch away from the light source in the second direction, and a first light guide portion is disposed in the first gap.

17. The display device according to claim 16, further including:
a display panel, including:
an array substrate, an opposite substrate, and a liquid crystal layer, wherein:
the array substrate and the opposite substrate are disposed opposite to each other, and
the liquid crystal layer is between the array substrate and the opposite substrate.

18. The display device according to claim 16, further including:

a camera disposed in the notch of the backlight module.

\* \* \* \* \*